United States Patent
Jenkins (10) Patent No.: US 7,364,627 B2
(45) Date of Patent: *Apr. 29, 2008

(54) METHOD FOR CONTROLLING CONCRETE WASHOUT

(75) Inventor: Mark Jenkins, Elk Grove, CA (US)

(73) Assignee: Concrete Washout Systems, Inc., Wilton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/511,859

(22) Filed: Aug. 28, 2006

(65) Prior Publication Data

US 2007/0062563 A1    Mar. 22, 2007

Related U.S. Application Data

(60) Division of application No. 11/080,378, filed on Mar. 14, 2005, now Pat. No. 7,124,767, which is a continuation of application No. 10/774,012, filed on Feb. 6, 2004, now Pat. No. 7,121,288.

(60) Provisional application No. 60/445,628, filed on Feb. 7, 2003.

(51) Int. Cl.
*B08B 9/00* (2006.01)

(52) U.S. Cl. .................. 134/10; 134/22.1; 134/42; 134/104.2; 134/201

(58) Field of Classification Search .......... 134/10, 134/42, 104.2, 201, 22.1
See application file for complete search history.

(56) References Cited

U.S. PATENT DOCUMENTS

| | | |
|---|---|---|
| 4,144,979 A | 3/1979 | Leach, Jr. et al. |
| 4,494,903 A | 1/1985 | Badicel et al. |
| 4,705,446 A | 11/1987 | Miller |
| 5,145,310 A | 9/1992 | Calzone |
| 5,387,736 A | 2/1995 | Salomone et al. |
| 5,685,978 A | 11/1997 | Petrick et al. |
| 5,695,280 A | 12/1997 | Baker et al. |
| 5,964,566 A | 10/1999 | Stewart et al. |
| 6,039,468 A | 3/2000 | Kowalcyzk |
| 6,152,672 A | 11/2000 | Alson |
| 6,206,476 B1 | 3/2001 | Welton |
| 6,413,036 B2 | 7/2002 | Welton |
| 2002/0092799 A1 | 7/2002 | Storruste |
| 2002/0098071 A1 | 7/2002 | Henderson |
| 2003/0205257 A1 | 11/2003 | Gross |
| 2004/0074903 A1 | 4/2004 | Klempner |

FOREIGN PATENT DOCUMENTS

JP    2-127280    5/1990

*Primary Examiner*—Zeinab EL-Arini
(74) *Attorney, Agent, or Firm*—John P. O'Banion (57) ABSTRACT

A washout container to which are mounted inclined ramps that allow a transit mixer, concrete pumping truck or other concrete handling vehicle to drive up over a portion of the container for dumping excess concrete and washing out waste concrete. The container cross-section may be rectangular to semi-circular, and is preferably fabricated with a steel structure. A watertight latching door assembly is coupled to the container to prevent leakage of collected liquid concrete waste material while allowing solidified concrete materials to be unloaded at a disposal site. The interior of the container is preferably lined with a material to which concrete will not adhere. The liner may be applied as a coating to the interior of the container or as a solid material retained within the container. In this way, solidified waste concrete can be easily removed from the container at the disposal site and preferably crushed for recycling.

13 Claims, 8 Drawing Sheets

METHOD FOR CONTROLLING CONCRETE WASHOUT

CROSS-REFERENCE TO RELATED APPLICATIONS

This application is a divisional of U.S. patent application Ser. No. 11/080,378, filed on Mar. 14, 2005, now U.S. Pat. No. 7,124,767, incorporated herein by reference in its entirety, which is a continuation of U.S. patent application Ser. No. 10/774,012, filed on Feb. 6, 2004, now U.S. Pat. No. 7,121,288, incorporated herein by reference in its entirety, which claims priority from U.S. provisional application Ser. No. 60/445,628 filed on Feb. 7, 2003, incorporated herein by reference in its entirety. Priority is claimed to all of the foregoing applications.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to waste management and debris removal, and more particularly to removal and disposal of waste concrete (slag) and concrete washout residues.

2. Description of Related Art

Concrete is used extensively in the construction industry and is typically carried to job sites in transit mixer trucks, or on site mixers, and may be moved at a work site to a point-of-use by concrete pump trucks. When pumping or pouring is complete, a small amount of concrete may remain in the truck, while concrete residues remain on portions of both vehicle mounted and manually operated equipment. Failure to quickly remove the concrete residues allows the concrete to harden thereby complicating the cleanup process and in some cases damaging the equipment. The mixer and pump portions of the truck along with concrete finishing tools must be washed off at the job site after pouring or pumping concrete to allow continued use of the equipment.

At present, concrete residue removal and cleanup is typically accomplished at a temporary disposal location, generally comprising a pit dug in the ground which may in some cases be covered with plastic sheet and surrounded by hay bails. On a concrete pump truck, a plug is removed from the bottom of the concrete pump which allows waste concrete to drain into the disposal pit. The concrete carrier portions are then washed, such as with a hose, to remove concrete residues. A similar operation is performed for transit mixer trucks, and other equipment for handling concrete.

Concrete itself, once hardened, is inert and harmless to the environment. However, the water used to cure concrete, or to clean equipment used to deliver and place concrete, can raise the pH level of surrounding waters and increase the heavy metal content, either of which can in some cases harm living organisms. Therefore, primarily due to environmental concerns and requirements, the concrete is commonly drained into a pit covered with a waterproof sheet, such as a plastic sheet. When the waste concrete materials harden, they are typically removed from the pit and transported to a permanent disposal site. The difficulty with such an approach is that it requires digging a pit, lining the pit, waiting for the waste concrete material to dry, and loading and transporting the dry waste concrete material to another site. In some cases a number of pits need to be dug, during a construction project increasing the impact to the environment. Furthermore, spills can occur while dumping the wet concrete into the pit and washing out the residues, while the sheet material is subject to punctures and tearing, any of which can impact the environment. Consequently, the washing out of concrete equipment must be performed with careful regard for containing runoff from construction sites.

As populations have grown and construction has crowded into new areas, building sites are increasingly being considered as possible threats to the environment. Environmental awareness is increasing and construction sites in many areas are required to follow "Best Management Practices" (BMPs) with regard to waste disposal practices, such as adhering to "Storm Water Pollution Prevention Plans" (SW-PPP).

Therefore, a need exists for an apparatus for facilitating concrete disposal that allows convenient emptying and cleaning of waste concrete from concrete mixing, hauling, and/or concrete application equipment without subjecting the environment to contamination hazards. The present invention satisfies those needs, as well as others, and overcomes the deficiencies of previously developed concrete disposal solutions.

BRIEF SUMMARY OF THE INVENTION

The present invention comprises a washout container for collecting mixtures of solid and liquid waste materials, such as a mixture of waste concrete (slag) and water from cleaning concrete residues from vehicles and tools. The washout container is preferably configured for allowing a vehicle to drive up on ramps to facilitate extending a portion of the vehicle out over the washout container for emptying waste materials (i.e. concrete, stucco, gunite, plaster, masonry, etc.) and cleaning up the equipment. It will be appreciated that although the present invention is particularly well suited for use with concrete transport vehicles, such as transit mixers, concrete pumping equipment, and the like, it can be utilized for collecting other mixtures of solid and liquid wastes, such as stucco, gunite, plaster, masonry, and so forth. The waste material will hereafter be generally described as concrete waste, however, it should be noted that the invention generally applies to other mixtures of liquid and solid waste materials. The invention provides an environmentally-friendly means of collecting liquid and solid waste materials, wherein after the liquid is drained and/or evaporated the solid materials may be removed therefrom.

Once waste materials, such as concrete slag and washout water, are collected, the liquid portion may be periodically removed from the washout container making more room for collecting additional waste material. The liquid may be collected such as by pumping into a container vehicle for proper recycling or disposal. By pumping off excess liquid, the washout container need not be hauled away until solid material has sufficiently built-up in the container to limit the space available for further disposal. The built-up solids may then be dumped out of the washout container at a later time for recycling or other proper disposal. The solids of the waste concrete are preferably crushed and recycled into road base in a manner similar to asphalt base.

The concrete washout container allows drivers to easily clean their equipment, trucks and pumps on site, which not only reduces unsightly construction mess but also controls, contains and captures waste runoff. After cleaning the equipment, the concrete washout material in the washout container is then hauled away and recycled. Both the water runoff and solid material contents of the washout container can be easily disposed of in an environmentally-friendly manner. Use of a concrete washout container can substantially reduce environmental concerns and aid compliance with "Storm Water Pollution Prevention Plans" (SWPPP), or other environmental regulatory issues.

The washout container apparatus comprises a concrete disposal (slag) container configured for receiving wet concrete and waste water and for easily removing the material solids at a later time. The washout container is preferably of a size and shape wherein multiple yards of wet concrete and runoff water may be collected. The walls and bottom of the container are reinforced, such as with a steel structure which supports the combined weight of concrete and container, such as for loading onto a truck, when hardened concrete is to be removed from the container off-site.

The shape of the container preferably follows a substantially rectangular geometry. The interface between the walls and the bottom of the container are preferably joined in a sloped or rounded section, to reduce the friction associated with removing the solid material. The bottom of the container, for example may be formed from flat steel plate with the sides bent into a radius, such as about a one-half foot to two foot radius, for joining to the sides of the container. The rounded lower corners simplify extraction of solid concrete materials from the container.

The sides and bottom may be formed from multiple steel sections or formed from a single piece of steel, such as following a rounded or semi-circular interior contour. The cross section may be substantially rectangular or more preferably provide rounded corners or a semi-circular cross-section with or without a flattened bottom portion. It should be appreciated that the use of rounded sides can substantially reduce the effort required for removing solid concrete materials from the washout container. It should be recognized, however, that different shapes may be adopted without departing from the teachings of the present invention.

To reduce the efforts required to remove solidified waste concrete materials from the washout container, it is preferable that the interior of the container be lined with a material that hardening concrete does not substantially adhere to. A liner material to which concrete will not adhere can be applied as a coating which hardens on the interior of the container, attached as a solid material joined to the interior of the container, or it may be attached as a flexible liner retained within the washout container. By way of example, a polymeric material may be utilized to which concrete does not substantially adhere, such as Tivar®. In this way, hardened concrete can be easily removed (e.g., by dumping) from the container at the disposal site. It will be appreciated that a number of quick release materials may be utilized for lining the container. Alternatively, the slag container may comprise a plastic container assembly that is supported within a metal frame. The solidified concrete material has been found to be readily removed from a washout container lined with a suitable form of durable non-stick plastic liner.

To reduce splatter at the washout site, the liner material or more preferably a separate flexible skirt material, may be adapted to extend up from portions of the washout container. The skirt preferably comprises a rubber or pliable polymeric material attached to the interior of the container and extending the walls of the container an additional distance, such as from approximately three to twelve inches.

A watertight door preferably forms a wall of the container. Upon opening the door the waste concrete may be removed, preferably after it at least partially hardens. The door opening of the washout container should be configured of sufficient width to accommodate the width of the concrete at its widest point. During loading, the door is retained in a latched position so that liquid from the combination of wet concrete and washout water does not leak from the container. Excess water may be drained or siphoned away from the washout container, allowing continued use of the container before the solid materials build up requiring emptying of the washout container, or the swapping of the full, or nearly full, washout container with one that is empty or at least not yet full.

The door may be unlatched to effect the removal of the concrete waste material. Typically the waste materials would be removed once they are at least partially dry. Less preferably, a portion of the container may be adapted for separation or articulation, thereby allowing removal of the hardened waste concrete. The door is preferably retained in a closed position by a latching means, although any convenient form of door retention mechanism may be selected. By way of example, a lever lock may be utilized with a ratchet tightener and butterfly drawnuts for retaining the door (tailgate) in a closed position. The latch is preferably configured for accepting a lock, wherein unauthorized parties can not open the door, such as before the retained concrete material has solidified.

To further reduce the forces required to remove solidified waste concrete from the washout container, the sides of the washout container may be tapered extending away from the door wherein the width of the container across the door span is slightly wider than the width of the container at the end opposite the door span. The slight taper can simplify removal of the waste solids because once the solidified concrete begins to move through the door it slightly separates from the walls of the container thereby reducing friction. Furthermore, the tapered container is less subject to increases in solid concrete removal forces in response to small dents and deformations in the washout container. Although the use of a tapered container can reduce necessary extraction forces, the construction techniques are typically slightly more complex and costly. The preferred embodiments are generally depicted without the taper as it has been found that solidified waste material can be readily removed from washout containers with parallel sides.

Ramps (fixed, articulated, and/or removable) are preferably coupled to the washout container to allow a concrete transport vehicle, such as a transit mixer, or concrete pump truck, to be driven up on the ramps wherein a portion of the vehicle extends over a portion of the washout container to allow waste concrete to be dumped into the washout container and the residual waste concrete to be washed out from the vehicle into the washout container. However, it will be appreciated that ramps are not always necessary if the washout container is sufficiently shallow, or if the washout container is to be deployed within a sufficiently deep recess which has been dug in the ground at the construction site.

A single washout container may be shared for cleaning out multiple concrete transport vehicles and equipment, so long as only one vehicle is utilizing the ramp, or preferably set of ramps, at any one given time. Less preferably, more than one set of ramps may be coupled to the washout container allowing additional vehicles to be simultaneously positioned over a portion of the washout container. In addition concrete residues can be washed from other equipment and tools at the washout container. For example, the ramps allow a transit mixing truck to back up to the opening of the washout container so that excess wet concrete can be dumped into the container, and the drum of the transit mixer washed out with the runoff during cleanup being collected in the washout container.

A preferred configuration of the ramps is as foldable ramps, wherein less horizontal space is taken up when the ramps are in the folded-up position. As the ramps can be of substantial weight (to support the weight of concrete transport vehicles), mechanisms for assisting in the folding or unfolding of the ramps may be incorporated. The ramps may include any form of lifting assistance means, such as spring assist, or the use of an actuator (hydraulic, electrical, mechanical), and so forth. One ramp assist device can be implemented as a winch. Another ramp folding assist device can be fabricated with a cable connecting to the washout container through a pulley and terminating on a portion of the ramp, allowing the ramps to be pulled up into a closed position for transit in response to the vehicle pulling on the cable. It should be appreciated that any convenient force generation, amplification, redirection mechanism or combination thereof may be utilized to facilitate raising and/or lowering of the ramps.

Alternatively or additionally, the ramps can be configured to engage and disengage from the washout container, wherein they may be selectively coupled to the washout container. Less preferably, the ramps can be configured for being securely retained astride the washout container, such as firmly attaching to the ground near the ramp. Furthermore, ramps having different characteristics (i.e. strength, incline angle, spacing, width, tread pattern, and so forth) may thereby be selected for use depending on the type(s) of equipment being washed out.

A top portion of the washout container adjacent to the vehicle ramps may be sloped to facilitate use of the ramps, provide more clearance, and to reduce the necessary length of the ramps. The sloped portion may be optionally configured to extend the ramps over a portion of the container, allowing the concrete vehicle to be positioned farther over the washout container during dumping and cleaning out of waste concrete from the vehicle. As a minor note, positioning the rear end of the washout container into a slight recess or depression can increase the capacity of a sloping wall washout container while reducing the necessary ramp incline.

The washout container may be configured with a means for limiting material entry or egress from the top of the washout container, such as by means of a lid or cover mechanism. The lid, or cover, prevents articles from falling or being deposited into the waste concrete material, while it also prevents wet material spillage and dry materials from being blown from the container during transit. The lid preferably comprises a roll of planar material pulled over the container, although alternative forms of closure may be utilized. The lid may be configured for deployment only during transit, such as unrolled from a truck configured to haul the washout container. A simple cover, such as a plastic tarp, may be utilized at the site for preventing water from precipitation or surface irrigation systems from filling the washout container. Although more costly, the use of a cover fabricated from a semi-permeable membrane can allow gaseous water evaporation, while providing a barrier which prevents liquid water, such as rain, from entering the covered washout container. It should be recognized that even under dry conditions (limited precipitation) it may be beneficial under certain circumstances or applications to cover the washout container at the site, for example with a porous cover (i.e. loose weave material, or netting) that allows the water to dehydrate from the washout container while preventing unwanted articles, including refuse, animals and individuals, from entering the washout container.

The washout container may be configured with a preferably movable catwalk, or for receiving a movable and/or removable catwalk, which allows operators to more easily access the portions of the equipment being washed out, such as cleaning a hopper. A catwalk extends across between the sides of the container-for supporting a person during the washout process, the catwalk is preferably positioned above the level at which concrete may be retained in the container. The catwalk may be optionally configured to slide or roll out of the way when not in use. A simple catwalk may be created by laying sections of lumber across between the sides of washout container, for example one or more sturdy two-by-twelve planks or other materials having sufficient strength for the weight of the operator(s).

The present invention may be generally described in a number of alternative ways. For example the apparatus may be described as a container having a plurality of inner wall surfaces; and means for preventing hardening waste materials, such as concrete, from adhering to the inner wall surfaces of the container. The means preferably comprising a liner that is either applied to the inner walls of the container and which subsequently hardens, a flexible liner retained in the interior of the container, or a solid liner held within a washout container structure. The liner may be fabricated of any material to which hardening concrete will not substantially adhere, such as a polymeric material which preferably has non-stick properties.

Vehicle ramps (fixed, articulated, and/or removable) are preferably coupled to at least one end, or side, of the washout container for providing an inclined plane upon which a vehicle can drive up to the container with a portion of the vehicle extending over the washout container for emptying and washing out concrete waste materials into the container. Ramps may include means for articulating and/or removing a least a portion of the ramp. The articulation means allows the ramp to be moved between an extended position configured as an inclined plane and a non-extended position such as for facilitating storage and transport. A hinge may be utilized as the articulation means and movement of the ramp may be facilitated using mechanisms for reducing the manual forces required for extending or storing the vehicle ramps. The ramps may be configured with a means for removably coupling to the washout container, for example a sliding post and bore engagement. Preferably an optional locking means, such as a spring loaded locking pin, is inserted to prevent the removable ramp from separating from the washout container during use.

Preferably a door encloses an opening in the container, such as an entire end or side of the container. The door is configured to allow emptying the container of solidified concrete waste materials without undue constriction through said door. Preferably a seal is retained between the door and the opening in the container, the seal being watertight upon the application of sufficient pressure, such as by a door latching mechanism.

The washout container is preferably fabricated from steel to provide the structural rigidity, and is preferably shaped with a rectangular to semi-circular cross-section, although other shapes may be employed. For a cross-section at or approaching rectangular, it is preferable that the interior corners be radiused, or chamfered, to reduce the forces required for extracting solidified concrete waste material from the container.

A portion of the container may be adapted with a sloped top surface adjacent to the vehicle ramps to provide improved clearance for vehicles as they back over the ramps and extend out over a portion of the washout container. These sloped surfaces may also be adapted to extend the length of the vehicle ramps, allowing a vehicle to be positioned further over the washout container. A flexible skirt may be retained on an upper portion of the washout container for reducing splashing during concrete washout. A section of flexible skirt is preferably attached surrounding the lower end of the sloped surface.

Supports on the washout container are configured to provide stability when in use and to simplify delivery and pickup of the washout containers. To that end, a pair of stabilizer skids is preferably attached to the bottom of the container which are configured for guiding the container onto or off of a truck adapted for transporting the container. Additionally, the washout container is preferably configured with one or more coupling structures, such as a hitch or hook for being engaged during loading. Furthermore, mechanical couplings are preferably incorporated for attaching a hoist or similar means of lifting and/or tilting the washout container, such as for moving the washout container and/or tilting the container to dump solid waste materials.

The present invention may also be described as a method of controlling concrete washout, comprising the steps of: (1) delivering a washout container at a site for collecting solid and liquid concrete waste material during the washout process from vehicles driven up on ramps attached to the washout container; (2) servicing the washout container in response to usage at the site by removing excess liquid waste from the washout container and hauling it away; and (3) picking up the washout container with collected concrete waste material from the site.

The excess water in the washout container may be removed in any convenient manner, such as by pumping or decanting. It is preferable that the washout container be periodically serviced, such as for removing excess liquid which allows retaining a given washout container on site for a longer period of use, such as until the buildup of solid concrete waste material limits continued washout activity. Once filled, the solid concrete materials are emptied from the washout container for processing or disposal. The solid material is preferably emptied by opening the door and tilting the container, or otherwise applying an urging (extraction) force upon the retained concrete waste material to remove it from the container.

The use of pumps and mobile liquid collection reservoirs are preferably incorporated within separate vehicles, or incorporated within the trucks configured for delivering and collecting the washout containers. By way of example fluid tanks may be attached beneath or on the side of the truck chassis, thereby providing a vehicle that can pump off liquids prior to collecting a washout container, or that may pump liquids from washout containers other than those being delivered or collected.

It should be recognized from the foregoing that the present invention provides a number of beneficial aspects which are outlined below.

An aspect of the invention is a leak-proof container within which wet waste concrete and washout water may be disposed of and from which the solid concrete waste material may be subsequently conveniently recycled.

Another aspect of the invention is a washout container structure having sufficient structural rigidity to contain solid and liquid concrete waste materials and to withstand being loaded onto transport vehicles with a full load.

Another aspect of the invention is a ramp system allowing transit mixers, concrete pump vehicles, and other concrete-laden vehicles to drive up onto the ramps over a portion of the container for unloading waste concrete into the container and for facilitating washout.

Another aspect of the invention is an articulated ramp system allowing altering the position of portion(s) of the ramp to facilitate use along with loading and unloading of the washout container from transport vehicles.

Another aspect of the invention is a removable ramp system, and optional locking device to prevent inadvertent disengagement.

Another aspect of the invention is the inclusion of a hardening concrete adherence-resistant liner material within the washout container so that the hardened, or hardening, concrete may be easily removed.

Another aspect of the invention is a washout container that can be readily loaded onto a truck, such as for delivering an empty washout container or hauling away a filled washout container to a disposal site.

Another aspect of the invention is a door, or other articulated opening, through which solidified waste concrete can be easily removed from the container.

A still further aspect of the invention is a lid for preventing unwanted items from being deposited within the container.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring to FIG. 1 through FIG. 8 an embodiment of a washout container 10 is shown according to the present invention. Wet waste concrete and liquid washout may be deposited in the washout container from a transmit mixer, or other concrete conveyance means, and concrete tool cleanup operations, without creating an environment hazard. Excess liquid can be pumped off into container vehicles for transport for recycling, allowing the washout container to be utilized for a longer period of time before it needs to be removed from the site. It should be appreciated that the washout container can be retained at the site until enough solid concrete waste materials build up to curtail further washout operations. The solid material of the waste concrete can be dumped from the washout container and broken up for use as a fill material. The invention therefore is adapted to simplify both the loading of concrete and waste water into the washout container, and for subsequently unloading the solid concrete waste materials.

Figure 1:
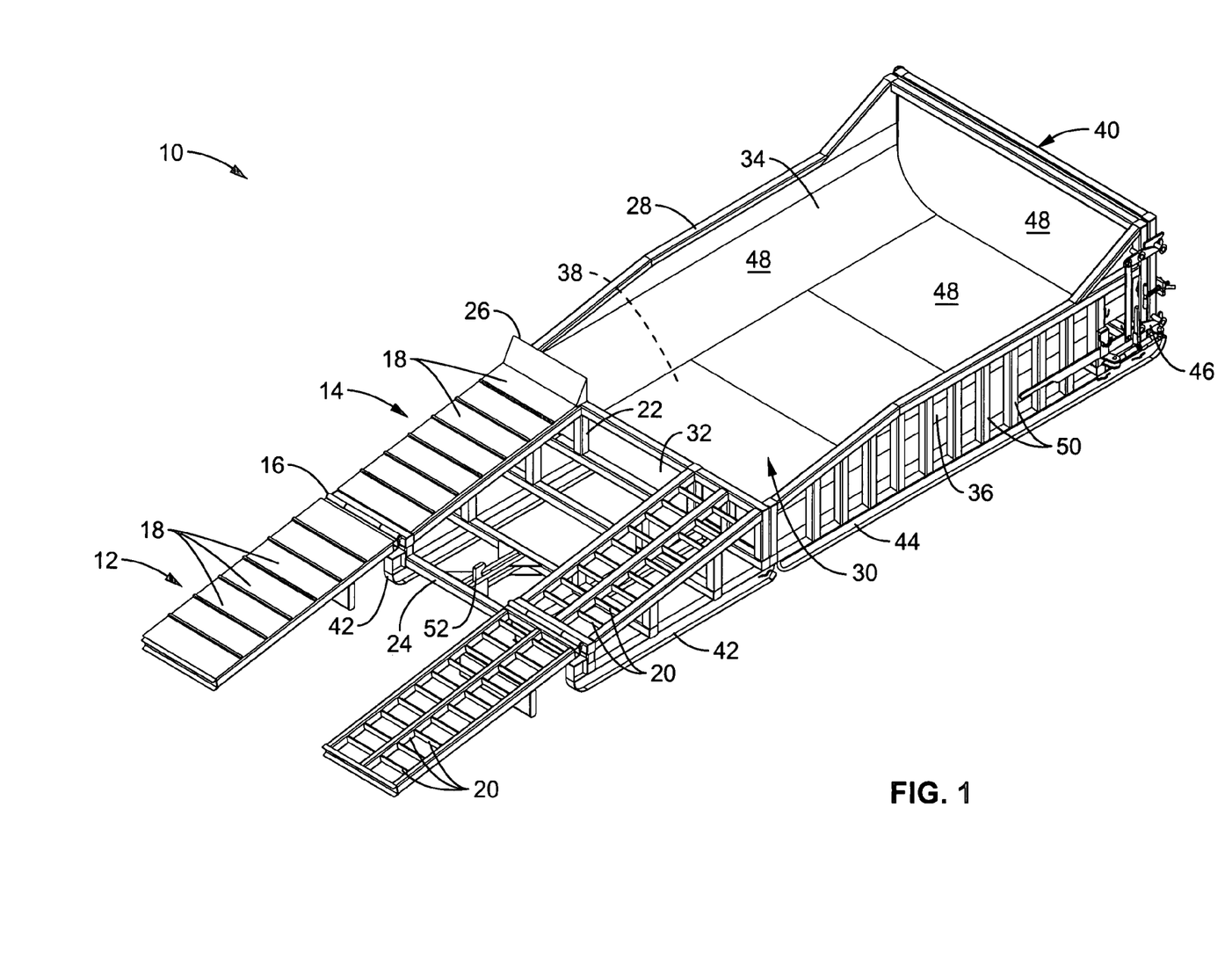
FIG. 1 is a perspective view of a washout container according to an embodiment of the present invention, shown with a portion of the outer metal panels removed so that the inner support structures are visible.
Figure 2:
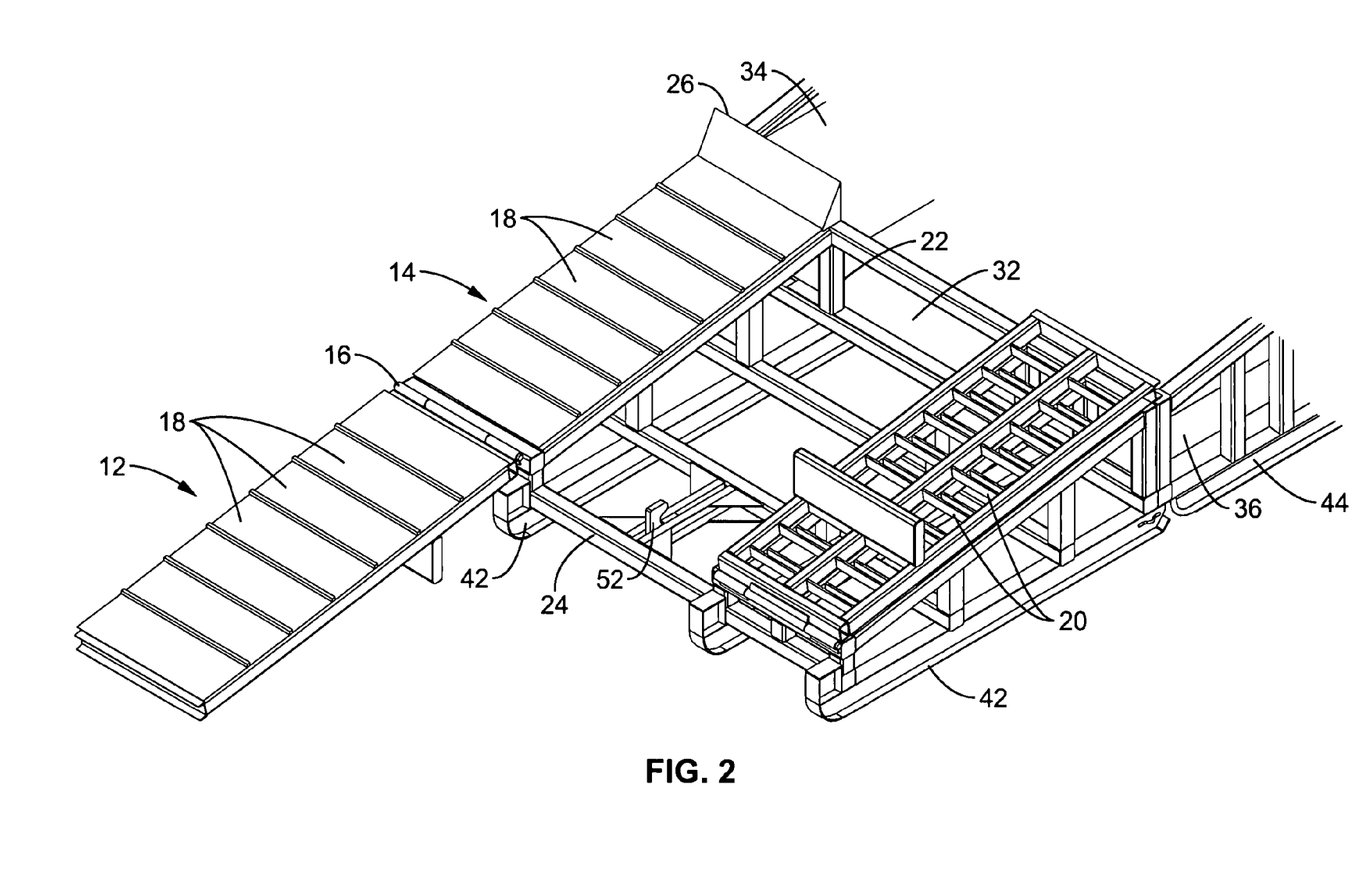
FIG. 2 is detailed view of the front portion of the washout container of FIG. 1, showing vehicle ramp details and the use of optional tread plates and wheel stops.
Figure 3:
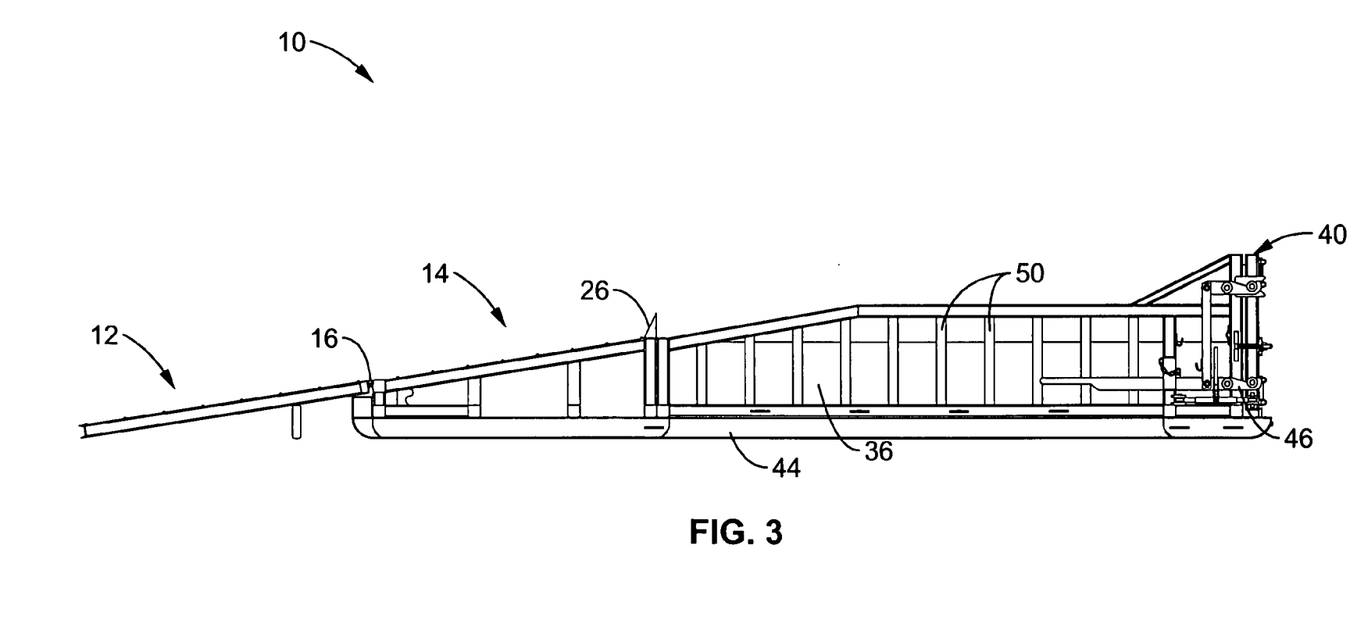
FIG. 3 is a side view of the washout container shown in FIG. 1.

FIG. 1 through FIG. 3 illustrate an example embodiment of a washout container 10 incorporating a ramp means, herein depicted as a pair of movable ramps 12 movably attached to a pair of fixed ramps 14. Movable ramps 12 are hinged at hinge points 16 so that the movable ramp portion 12 can be folded over the fixed ramp portion 14 when not in use. The ramps preferably extend for approximately three to eight feet and rise from ground level to the top of the washout container, which for this embodiment is shown at a height of approximately two feet. It will be appreciated, however, that the washout container may be configured to any desired height, such as from one foot to four feet in height, in order to suit the intended application. Furthermore, the length of the ramps is generally determined by the height of the washout container, and the allowable pitch (incline) of the ramps, so that concrete-laden vehicles to be cleaned can easily be positioned over the reservoir within the washout container.

In the figure, both moveable ramp 12 and fixed ramps 14 are shown optionally covered with metal tread plates 18 for supporting the tires of a concrete laden vehicle. It will be appreciated that tread plates are not necessary if the ramp support structure provides sufficient traction-inducing lateral supports to allow a vehicle to climb the grade for positioning on the washout container. The optional solid or perforated (i.e. perforated steel mesh) tread plates 18 may be attached to the ramp structure, as desired, to aid traction. Alternatively, separate lateral supports may be coupled to the top face of the ramp, such as welded steel straps or rods, to increase vehicle traction. The ramp in the foreground is shown with tread plates removed so that the supportive grid structure 20 of the ramp is visible. The ramp and surrounding structure are shown in a preferred embodiment comprising joined steel sections, such as welded vertical 22 and horizontal 24 steel support members.

The framing of the washout container and the ramp system is preferably of metallic construction and preferably sized to support a truck capacity of up to 30,000 pounds. It should be recognized, however, that the truck typically only utilizes the ramps when unloading leftover "waste" concrete or for performing washout operations, whereby the vehicle should be relatively lightly loaded. For example, a concrete truck can be driven up the ramps into position, the plug on the bottom of the concrete truck reservoir opened, and the excess concrete dumped into the container, whereafter concrete residues may be washed out into the washout container.

Optional wheel stops 26 are shown at the upper end of fixed ramps 14 to limit the extent that the vehicle backs toward the washout container. The wheel stops may be configured as removable, thereby allowing the ramp assembly to be adapted for a wide variety of vehicles. The wheel stops are not required and may be eliminated entirely. The wheel stops, for example, can in some cases pose an impediment which can prevent equipment having a small vertical clearance, such as concrete pumping trucks, from driving up the ramps.

Typically, persons are available at the job site to aid the driver in backing up a concrete-laden vehicle onto the ramp supports for positioning over the washout container. However, if unassisted operation is desired, a signaling means may be incorporated on the washout container, or the ramps for attachment to the washout container. By way of example and not limitation, this may be implemented in a number of ways, such as a mechanical signal flag (i.e. flag that swings out to the side as a wheel backs over an attached lever), a signal operated in response to pneumatic pressure as the wheels drive over a compressible reservoir, an electrical signal incorporated on the ramp to indicate vehicle positioning, or other signaling means or combinations thereof may be utilized.

The washout container preferably has side rails 28 at the top edge of the container. An upper opening 30 of washout container 10 is defined by a metal front wall 32, metal sides 34, 36, and a metal rear door 40. Enclosing the bottom of opening 30 is a metal bottom 38 which in combination with the sides defines a reservoir for containing concrete waste materials.

It will be appreciated that in general, and without departing from the present invention, that the sides of the washout container may be raised to provide a permanent or removable splash guard if splash containment issues arise. For example a flexible skirt, such as comprising a thick neoprene rubber, polymeric material or similar may be attached extending upward from the washout container, such as on the container near ramps 14 to better contain washout splatter.

Optional structural sections 50 may be incorporated on the exterior of the washout container to provide additional support as necessary. The use of optional structural supports will typically depend on the geometry of the washout container in relation to the gauge of steel utilized in its construction. Optional flat panels may be attached to the exterior of the container, such as over structural supports 50, to provide a flat region upon which signage may be posted.

A loading hook 52 is depicted on the front of washout container 10 to facilitate loading and unloading of a washout container to, or from, a truck such as for unloading an empty washout container, or collecting a filled washout container. Alternatively, any convenient form of loading engagement means may be utilized with the washout container to facilitate loading and unloading, such as to and from a washout container transport vehicle. Furthermore, the washout container may be configured with additional couplings, such as hooks, rings, engagement apertures, and other mechanical structures which can be engaged for lifting and/or tilting of the washout container, such as for emptying the solid contents of the container.

It should be recognized that hardening concrete can adhere to the metal surfaces of the washout container thereby complicating the task of removing the waste solid material from the washout container. Consequently, the present invention preferably employs a substantially non-stick material retained on the inner walls of the container. The non-stick material may be joined to the interior of the container by applying a suitable liquid or gel material which hardens into a non-stick liner, retaining a flexible sheet of non-stick material, or inserting a substantially rigid liner within the washout container.

For example, the inside walls and bottom of the container may be lined with a non-stick liner 48, such as one fabricated from a polymer, for instance Tivar®, to which hardening concrete does not substantially adhere.

Alternative materials may be utilized as a liner for preventing the hardening concrete from sticking to the walls and bottom of the washout container. If a rigid liner is utilized, it is preferably of a sufficient thickness, such as approximately one-eighth to one-quarter inch, to prevent breakage and tearing. It should be noted that rear door 40 is preferably not lined so as not to create a seal/suction problem when the concrete hardens. Typically, no liner should be necessary for the door since the door will separate from the concrete when it is opened.

A pair of outboard skids 42, 44 preferably supports the structure as shown. A typical size for the container is approximately eight feet wide, twenty-two feet long, and two feet high. This size washout container provides for a capacity of approximately seven and one-half cubic yards of concrete. The components are preferably welded together to form an integral structure except for rear door 40, which is hinged. Note that the ramps and skids make this structure quite different from a conventional dumpster.

Rear door 40 is hinged, such as either the top or sides, to allow the door to swing open for dumping solid concrete waste material. Door 40 is shown extending up beyond the height of sides 34, 36 as a guard against wet concrete splashing. A latching means is exemplified herein by the use of a conventional manually operated ratchet-type latch 46 for retaining the door in a closed position, although any convenient latching means may be incorporated without departing from the present invention. A seal element, such as fabricated from neoprene rubber, latex, silicone, or other similarly compliant material, is preferably incorporated to maintain a watertight seal on door 40 to prevent leakage of slag concrete and washout. It will be appreciated that other sealed door structures may be utilized within the present invention without departing from the teachings herein. One or more of the door latches may be configured for receiving a lock to prevent unauthorized personnel from opening the locked door, such as when the concrete may still be wet.

Standing liquids can be periodically pumped, or less preferably decanted, from the washout container into a mobile collection reservoir for hauling the waste water to a location for processing. Decanting may be facilitated in the present invention by inclusion of a means for tilting the washout container to decant the liquids over settled solid materials, and/or the use of a plurality of removable drain plugs at different heights on the periphery of the washout container from which excess liquid may be drained into buckets, or other liquid collection mechanism. By way of example, pluggable drain holes in the washout container can be formed by welding nuts on the exterior of the container aligned over circular apertures into which threaded bolts similar plugs may be received.

To facilitate disposal of the hardened waste concrete and materials, container 10 is preferably configured for lifting, tilting or otherwise being positioned for dumping, wherein rear door 40 would be opened through which the hardened concrete would be slid out of the container. The hardened concrete material can then be crushed and recycled as road bed material or directed for other beneficial uses.

Figure 4:
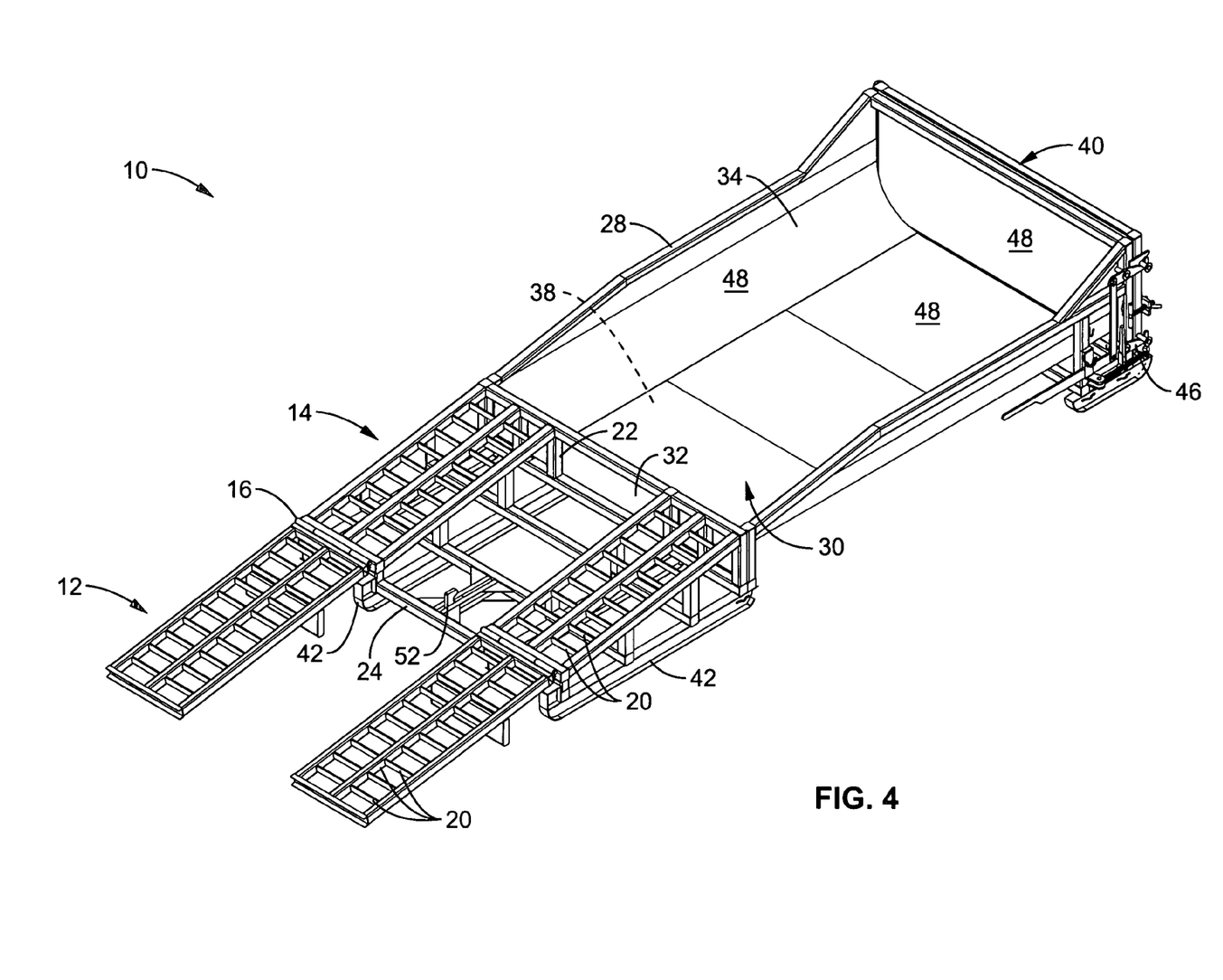
FIG. 4 is a perspective view of a washout container according to an embodiment of the present invention, shown having self-supporting container sides.

FIG. 4 illustrates an example of a rounded side washout container 10 fabricated from a sufficiently thick gauge of steel, wherein supports 50 are not necessary. It should be noted that skids 44 are attached underneath portions of the steel bottom 38 of the washout container.

Figure 5:
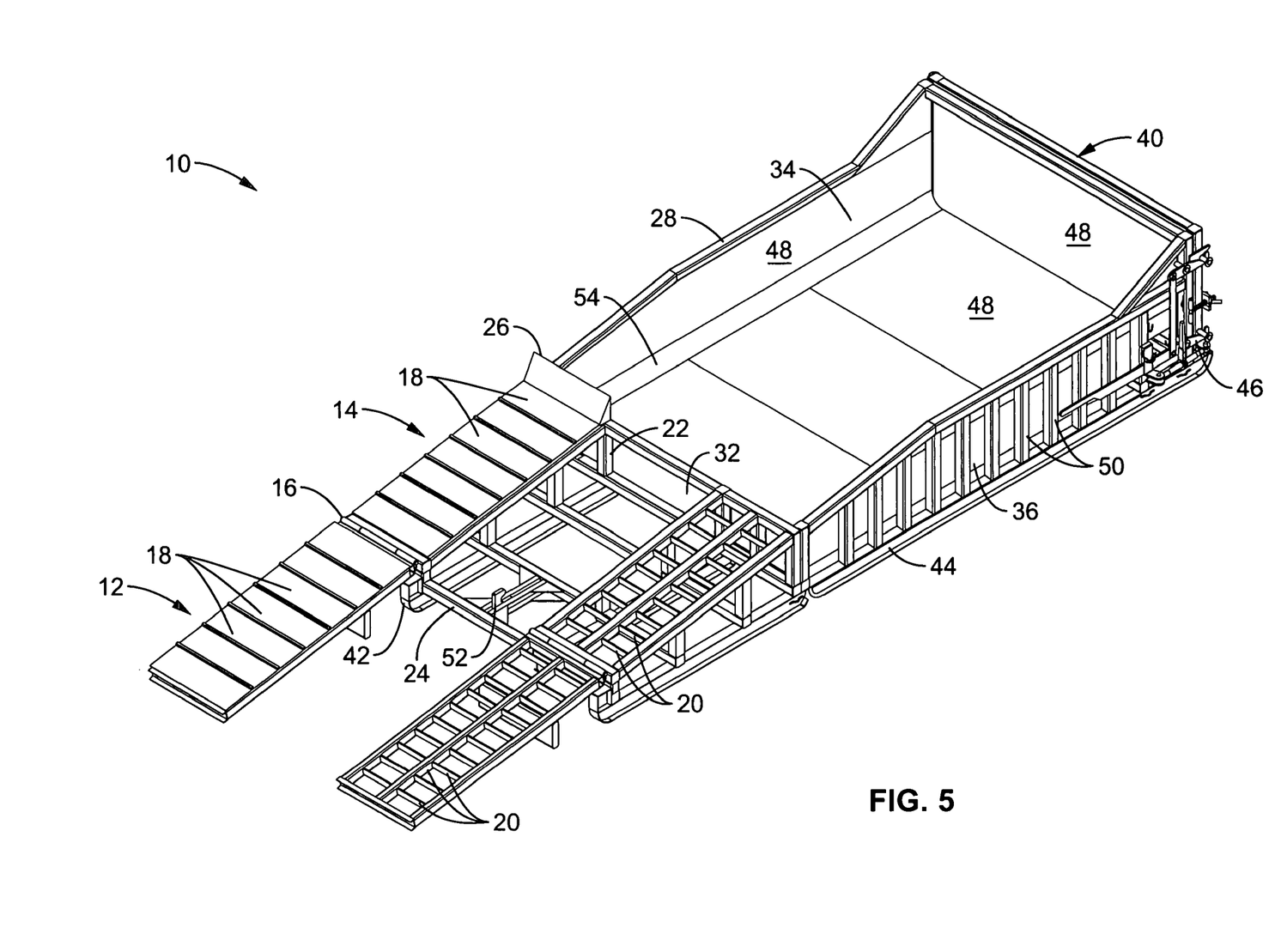
FIG. 5 is a perspective view of a washout container according to an embodiment of the present invention, shown with smaller rounded corners in the lower portion of the washout bin than those of FIG. 1.

FIG. 5 illustrates an example of a washout container 10 having sides 34 which meet bottom 38 at lower corners 54, shown by way of example with a radius of approximately six inches. It will be appreciated that rounded corners of various shape and dimension may be incorporated for facilitating removal of waste concrete and materials.

Figure 6:
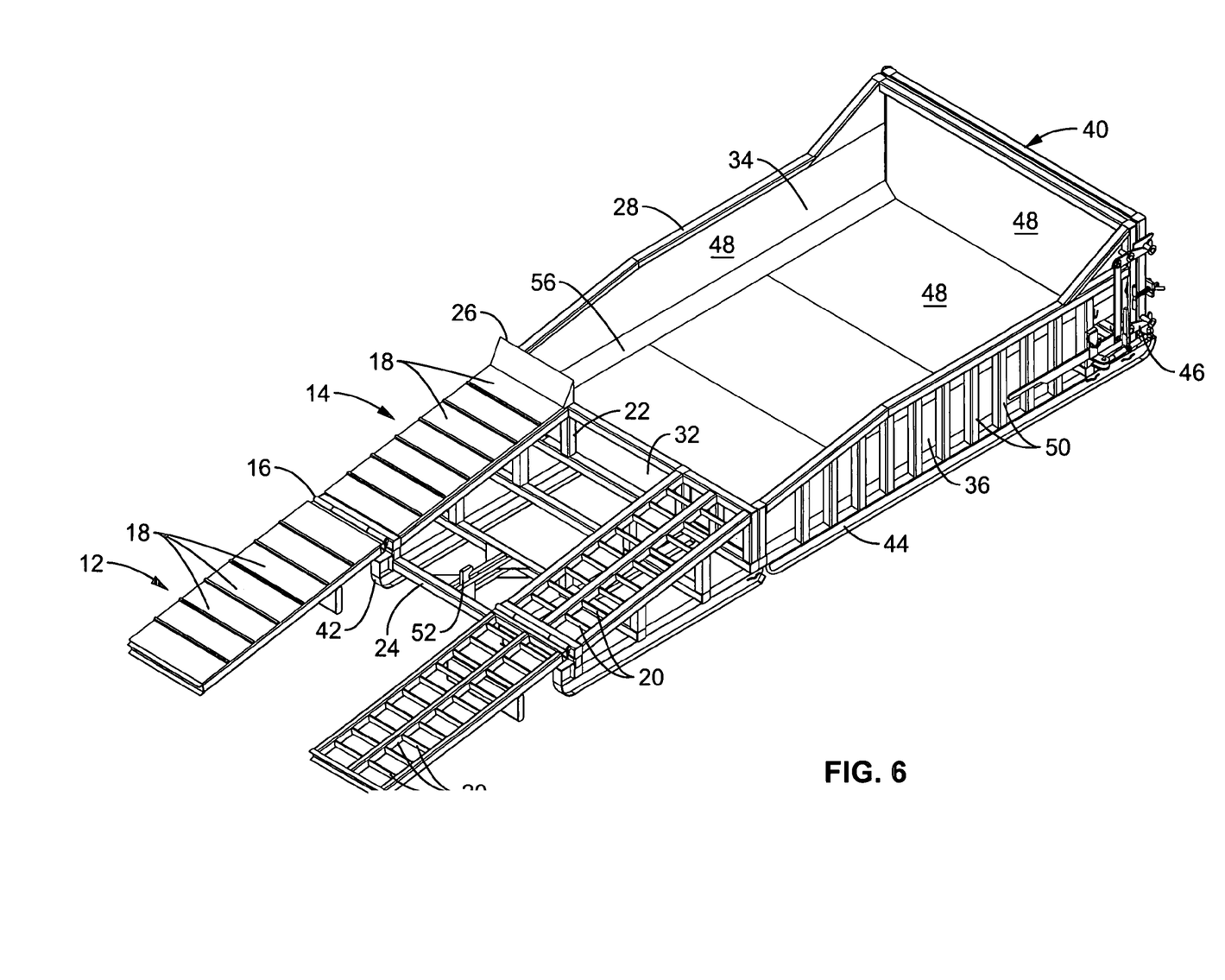
FIG. 6 is a perspective view of a washout container according to an embodiment of the present invention, shown with beveled corners in place of the corners shown in FIG. 5.

FIG. 6 illustrates an example of a washout container 10 having sides 34 which meet bottom 38 at beveled corners 56, shown by way of example angled at approximately forty-five degrees and having a span of about six inches. It will be appreciated that corners of various shape and size may be incorporated for facilitating removal of waste concrete and materials, without departing from the teachings of the present invention.

Figure 7:
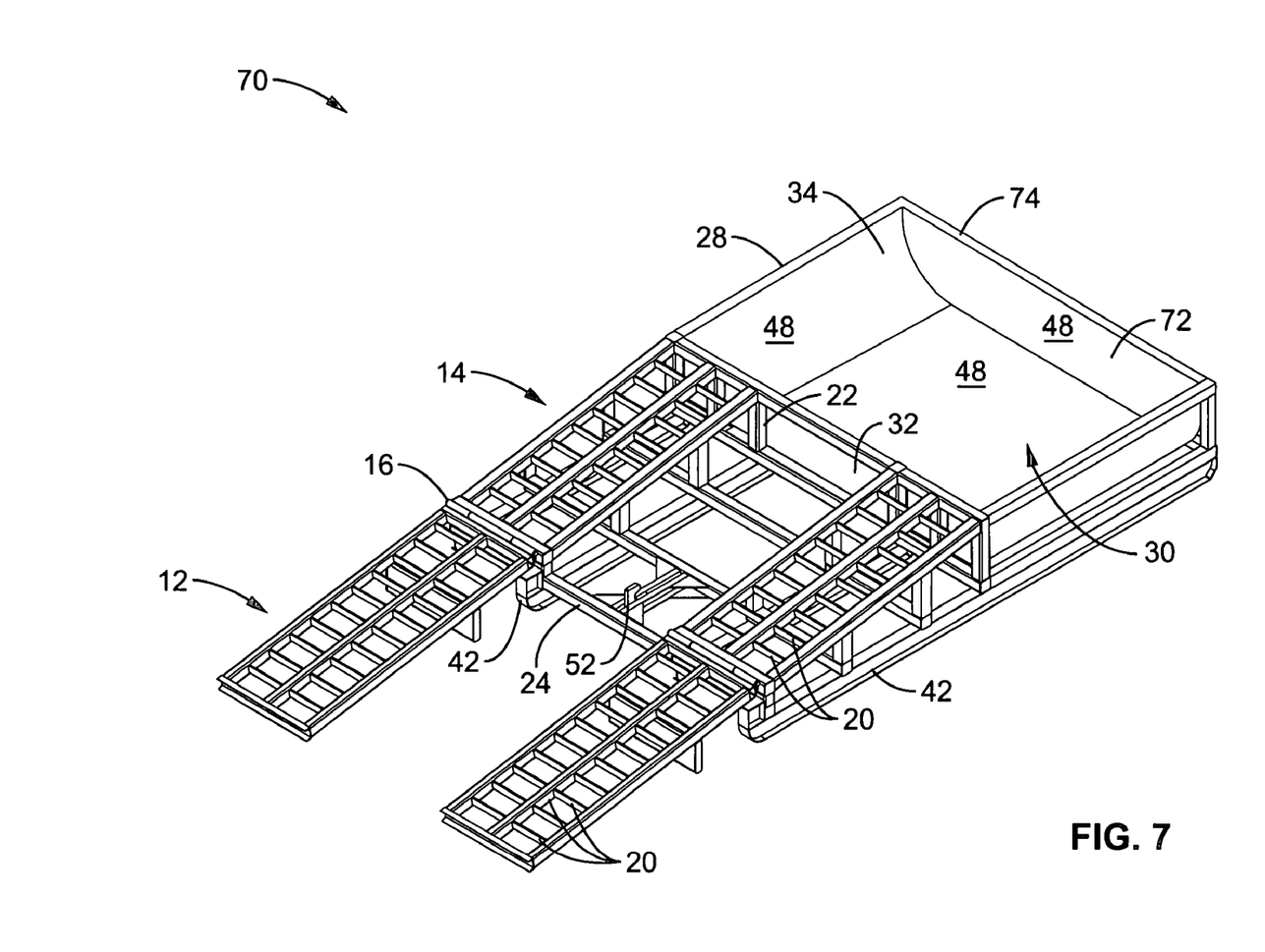
FIG. 7 is a perspective view of a washout container according to an embodiment of the present invention, shown having a small one to two cubic yard washout bin which is depicted without an unloading door.

FIG. 7 illustrates an example embodiment of a smaller washout container 70. It should be appreciated that smaller washout containers may be fabricated according to the teachings of the present invention having a size suitable for jobs such as driveway pours, decking, stucco application, gunite or plaster applications (i.e. for pools), and so forth. In these instances less waste material needs to be disposed of, wherein a large washout container is not necessary. The small washout container 70 is shown in the figure for retaining approximately two yards or less of waste materials and washout water. The small washout container shown is well adapted for use with removable ramps due to the reduced container height. It should also be appreciated, however, that sufficiently shallow washout containers need not be configured for use with ramps, insofar as the equipment being utilized can be washed out in the washout container without the assistance of ramps.

The smaller washout container 70 is shown with a fixed wall 72 having a top rail 74 replacing door 40 of FIG. 1. Although any sized washout container according to the invention can be fabricated with or without a door, it will be appreciated that it is easier to manually remove smaller quantities of hardened material than larger quantities, especially when the depth of retained material prevents hardened material from being easily broken up and removed in pieces. Alternatively, lining 48 of small washout container 70 can be configured for being manually tipped up, such as from one side of the steel support structure, to facilitate disposing of small amounts of hardened material.

Figure 8:
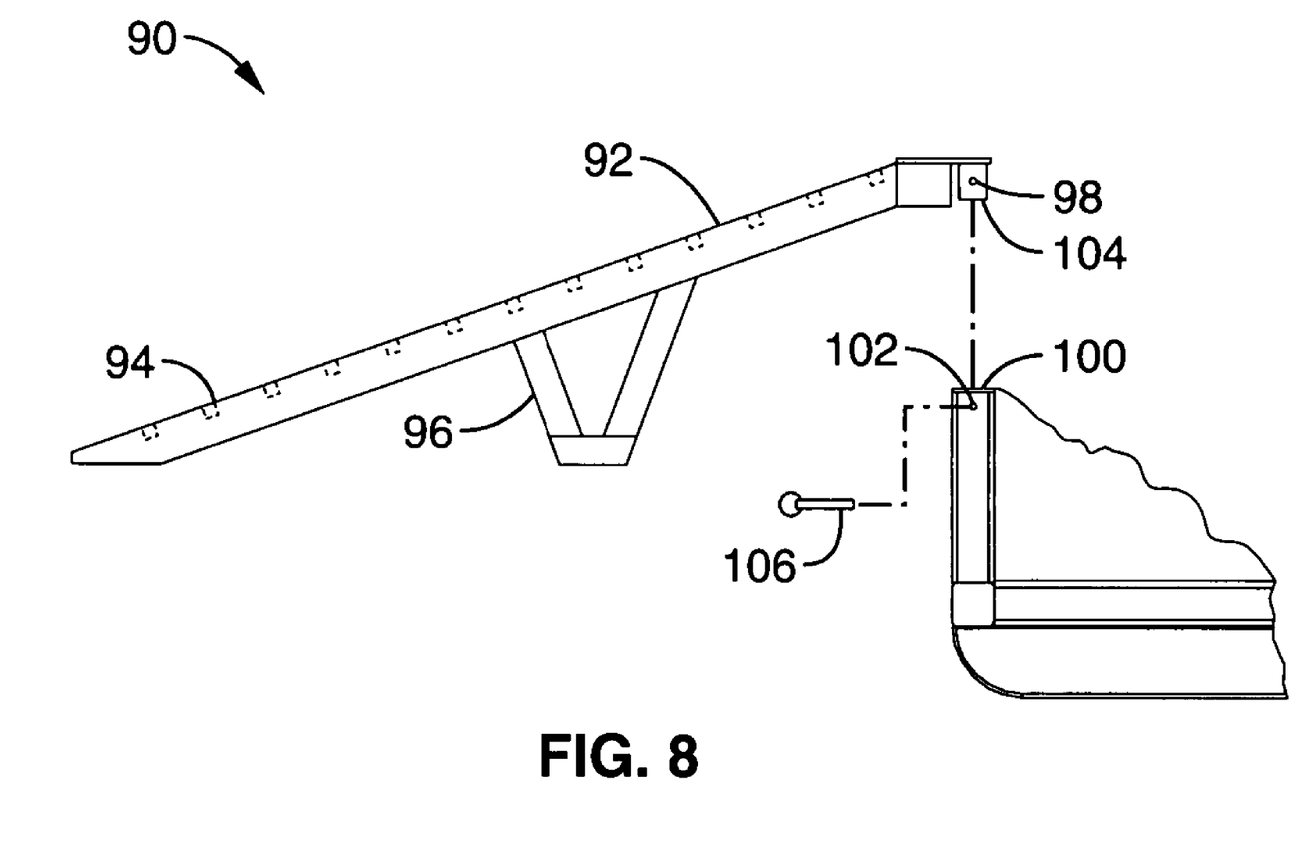
FIG. 8 is a side view of a removable ramp being coupled to the end or side of a washout container according to another aspect of the present invention, shown with an optional locking means.

FIG. 8 illustrates an example of a removable ramp 90, such as configured for engagement to the edge of a washout container, such as to small washout container 70 of FIG. 7, although it may be adapted to suit washout containers of any desired size and shape. A ramp section 92 is shown with lateral supports 94, or tread plates, and an optional support along its central span comprising protruding structure 96. A means of retaining the ramp proximal to the washout container is exemplified by a stem 98 capable of insertion into a bore 100. It should be appreciated that any convenient coupling mechanism may be selected from the numerous coupling mechanisms known in the art. By way of further example, a horizontally facing stem with an underside retention groove can be inserted into an appropriately-sized receptacle cut into the face of a support pillar. A means for locking ramp 90 to the washout container is preferred, such as illustrated by corresponding apertures 102, 104 in the container and ramp which are configured for receiving a locking pin 106. Less preferably, a mechanism can be provided on the ramp or ramps to retain them in a position astride the washout container, such as engaging the ground beneath the ramp. However, under certain conditions or if used improperly a ramp which is not coupled to the washout container may move, or the washout container may move, which in either case subjects the vehicle to damage from falling.

The washout container of the present invention may be utilized in combination with additional devices to further facilitate the collection and disposal of waste concrete. The following are but a few examples of elements that may be utilized with the present invention. A catwalk (fixed or more preferably movable and/or removable) can be supported over the container, allowing an operator to safely clean the hopper of a transit mixer or similar after emptying wet waste concrete into the container. A lid can be supported over the waste container, to prevent debris and other unwanted elements from mingling with the wet concrete. It should be appreciated that in these and other ways the utility of the present invention can be extended in a variety of ways without departing from the teachings of the present invention.

To facilitate rapid deployment of these environmentally-friendly washout containers, a method of controlling concrete washout is described which may be utilized with the apparatus of the present invention, or with washout containers in general. A method of controlling concrete washout is described comprises the following. (1) Delivering a washout container at a site for collecting solid and liquid concrete waste material during the washout process from vehicles driven up on ramps attached to the washout container. (2) Servicing the washout container in response to usage at the site by removing excess (standing) water from the washout container and hauling it away for proper recycling/disposal. For example, the excess water can be removed by pumping it from the washout container into a mobile collection reservoir for hauling the waste water to a location for processing. (3) Picking up the washout container with collected solid concrete waste material, or other forms of washout waste materials.

The washout containers may be preferably rented, or leased, for a period of time which includes delivery, servicing, and pickup. Alternatively, fees for servicing the washout container may be more preferably levied separately as the need for the service is dependent on the rate of washout container usage. In addition, the buildup of solids within the washout container can warrant swapping out a substantially full container with an empty container, to allow dumping the solids from the full washout container while the empty washout container services the job site. The cost of dumping solid materials before the end of a rental, or lease, is also preferably handled as a separate service charge as it is dependent on usage rate.

The present invention provides numerous benefits and features which reduce the environmental hazard of washout while simplifying the process of disposing of waste concrete, and/or other material, and the water runoff associated with washout and equipment cleanup. The implementation of the present invention has been described in relation to a generally preferred embodiment, however, it should be recognized that the system may be utilized with or without a number of the feature elements, and that the invention may be implemented in a number of alternative ways without departing from the teachings of the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of controlling concrete washout, comprising:
providing a portable concrete washout container with a plurality of constructed walls comprising first and second side-walls extending between first and second ends and a bottom, and with a plurality of inner wall surfaces, and also with a substantially open and un-covered top;
applying a release material to at least one of said plurality of inner wall surfaces of said container;
wherein said release material comprises a solid material liner which is resistant to an adherence of hardening concrete washout material;
placing a volume of hardening concrete washout material in said container;
allowing the volume of concrete washout material to substantially harden into a substantially hardened condition within the container; and
allowing the volume of concrete washout material in the substantially hardened condition to separate from the solid material liner under its own weight and removing said volume of concrete washout material in the substantially hardened condition from said container through an opening at the second end by tilting the container with the first end above the second end.

2. A method as recited in claim 1, wherein said solid material liner comprises a material selected from the group consisting essentially of a polymeric material, a flexible liner, and a plastic liner.

3. A method as recited in claim 1, wherein:
said container includes a sealed door structure configured to facilitate removal of hardened concrete from said container.

4. A method as recited in claim 3, wherein at least one of said plurality of inner wall surfaces is tapered outward relative to said sealed door structure to facilitate removal of hardened concrete.

5. A method as recited in claim 4, further comprising removing said volume of concrete washout material in the substantially hardened condition through said sealed door structure in the open condition.

6. The method of claim 1, further comprising:
supporting the container on the ground with a pair of skids extending downward from the bottom of the container.

7. The method of claim 1, further comprising:
driving a vehicle up a ramp assembly adjacent the container; and
washing the volume of concrete washout material in the substantially hardening condition from the vehicle on the ramp assembly and into the container through the substantially open and uncovered top.

8. The method of claim 1, further comprising:
supporting the side-walls of the container with a plurality of vertically oriented structural support members.

9. A method of controlling concrete washout, comprising:
providing a portable concrete washout container comprising a plurality of constructed walls with first and second side-walls extending between first and second ends and a bottom, and with a plurality of inner wall surfaces, and also with a substantially open and uncovered top;
applying a release material to at least one of said plurality of inner wall surfaces of said container;
wherein said release material comprises a solid material liner which is resistant to an adherence of hardening concrete;
wherein said container includes a sealed door structure located at the second end and that is adjustable between a closed condition and an open condition configured to facilitate removal of hardened concrete from said container through the second end;
wherein at least one of said plurality of inner wall surfaces is tapered outward relative to said sealed door structure to facilitate removal of hardened concrete washout material;
placing a volume of concrete washout material in a hardening condition in said container; and
allowing the volume of concrete washout material in a substantially hardened condition to passively separate from the solid material liner under its own weight and removing said volume of concrete washout material in the substantially hardened condition from the container through said second end by adjusting the sealed door structure to the open condition and tilting the container with the first end above the second end.

10. A method as recited in claim 9, wherein said solid material liner used comprises a material selected from the group consisting essentially of a polymeric material, a flexible liner, and a plastic liner.

11. The method of claim 9, further comprising:
supporting the container on the ground with a pair of skids extending downward from the bottom of the container.

12. The method of claim 9, further comprising:
driving a vehicle up a ramp assembly adjacent the container; and
washing the volume of hardening concrete washout material from the vehicle on the ramp assembly into the container through the substantially open and uncovered top.

13. The method of claim 9, further comprising:
supporting the side-walls of the container with a plurality of vertically oriented structural support members.

* * * * *